Feb. 26, 1929. J. B. HADAWAY 1,703,818
CAMERA
Filed Feb. 6, 1926 2 Sheets-Sheet 1
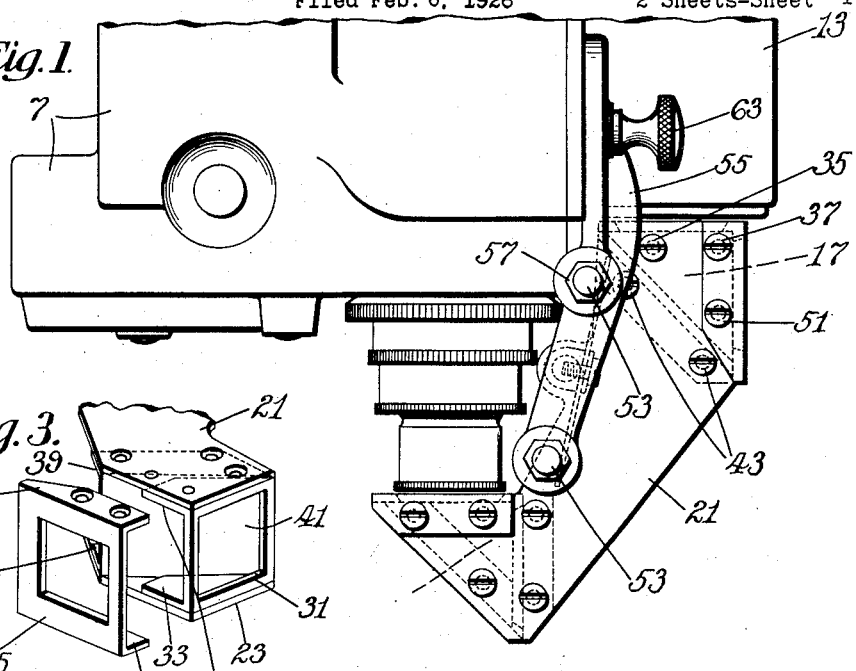
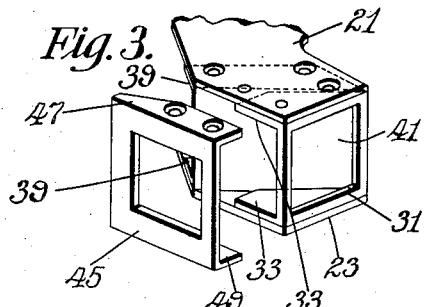
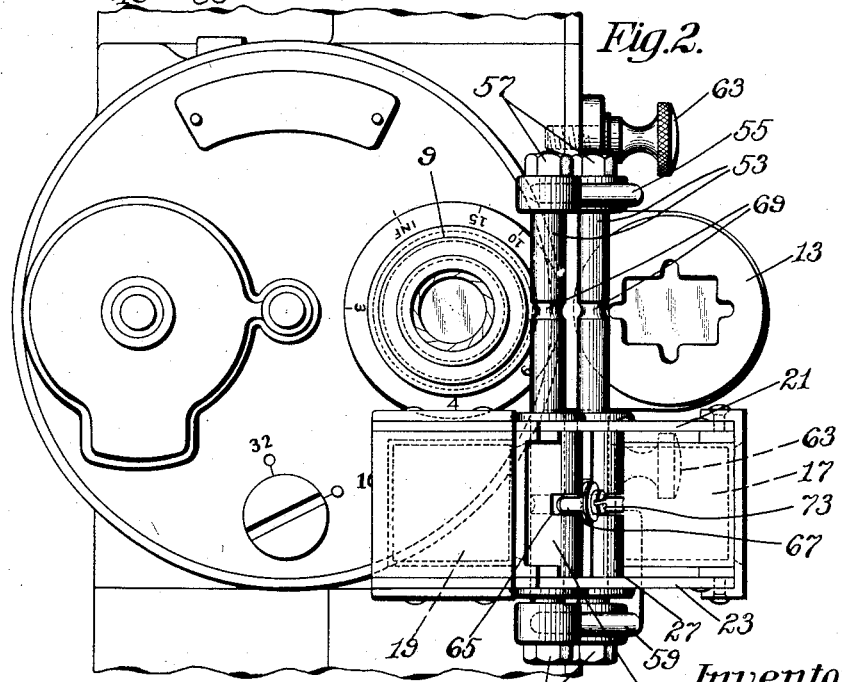
Inventor.
John B Hadaway
by Fred W. Guibord
Atty.

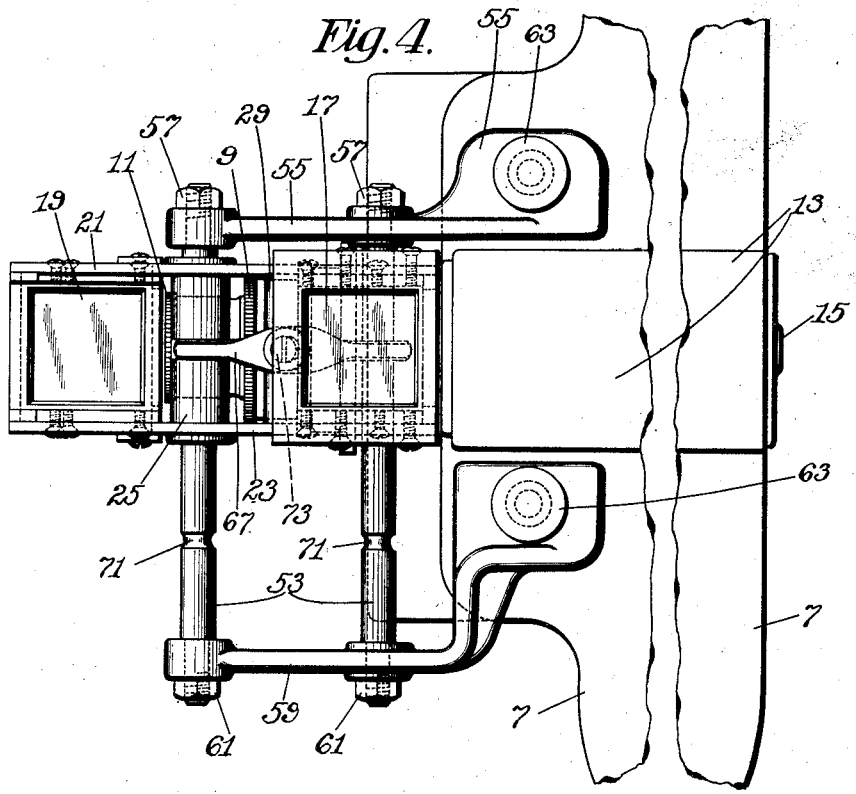

Patented Feb. 26, 1929.

1,703,818

UNITED STATES PATENT OFFICE.

JOHN B. HADAWAY, OF SWAMPSCOTT, MASSACHUSETTS.

CAMERA.

Application filed February 6, 1926. Serial No. 86,517.

This invention relates to cameras and is herein illustrated as embodied in a portable moving picture camera.

Hitherto, so far as I am aware, it has been necessary to point the lens of a moving picture camera directly at the object which is to be photographed so that, if the object is a person and the camera is anywhere near him, he is aware that he is being photographed and can defeat the photographer's purpose by turning his back on the camera or putting his hand before his face or employing some such ruse. Very frequently a person who is a stranger to the photographer will object to being photographed, or at least will endeavor to get out of the picture, if he sees a camera being pointed at him. Moreover, leaving out of the question such persons as object for one reason or another to being photographed and considering only those who have no such objection, it is a well-known fact that a person who sees a near-by camera being pointed at him almost always assumes an unnatural pose or facial expression—that, indeed, few persons can help doing so—with the result that the effect which the photographer desires to secure is spoiled. For the reasons given above, the task of the tourist, for example, who wishes to secure desirable near-by views of interesting persons or groups of persons is exceedingly difficult. Those who object to being photographed can usually succeed in defeating the photographer's purpose; those who do not object become self-conscious and assume unnatural poses or expressions. Moreover, in some instances, for example, among people who have a superstitious fear of photography, the taking of a photograph, or the attempt to take one, may be accompanied by physical danger to the photographer.

One object of the present invention is to enable a moving picture to be taken of a person who is located in a direction from the camera quite different from that in which the camera is pointed so that such person shall not be aware that he is being photographed. To this end, reflecting means is provided in front of the view finder and in front of the lens so that an object or a person standing well to one side of the direction in which the camera is pointed will be clearly visible in the view finder and, while the film or plate is being exposed, will still be clearly visible in the view finder so that the photographer may see at all times whatever is being photographed and move the camera as may be required. In the preferred embodiment, this reflecting means takes the form of two total-reflection prisms mounted in a carrier which is held in such position that one prism is directly in front of the view finder and the other directly in front of the lens so that a picture may be secured of a person whose direction from the camera lies substantially at right angles to the direction in which the camera is pointed. And in order that the camera may be used in the ordinary way, when desired, the carrier is so mounted that it may readily be moved into inoperative position in which the prisms are no longer effective.

The natural expressions of persons' faces are seldom secured when such persons are conscious of being photographed especially when a portable moving picture camera is used, both because of the noise of the operation of such a camera, which is usually clearly audible, and because of the length of time necessary to the taking of a moving picture which adds to the embarrassment of the person who is being photographed. When the present invention is employed, the person being photographed is seldom aware of what is going on, since the camera is pointed and the photographer facing in a direction quite away from him, and frequently he amuses himself by watching the photographer take what he believes to be a picture of some other person or object, with the result that he assumes a natural posture and an interested expression.

This and other features of the invention, including certain details of construction and combinations of parts, will be described as embodied in an illustrative device and pointed out in the appended claims.

Referring now to the accompanying drawings,

Figure 1 is a plan of the forward portion of a portable moving picture camera embodying the invention:

Figure 2 is a front elevation;

Figure 3 is a perspective showing a portion of the carrier which holds the prisms;

Figure 4 is a side elevation of the camera, a large part of the middle portion being broken out;

Figure 5 is a plan of a modified carrier and reflecting means in which mirrors are employed instead of prisms, and Figure 6 is an elevation of the modified frame and reflecting means.

Referring first to Figure 4, the body portion of a portable moving picture camera is indicated at 7, the lens holder at 9, the lens cap at 11, the view finder consisting of a telescope of universal focus at 13, and the sight aperture at 15. The camera, as thus far briefly described, is old and well known. In the operation of it, the photographer holds it pointed toward the object with his eye in register with the sight opening, presses a button and holds the camera pointed at the object, moving the camera if the object is a moving one, while the film is being exposed.

With the camera of the present invention, assuming that the camera is pointing to the left, as viewed in Figure 4, what will appear in the view finder and eventnally be photographed, will be some object located in the position of the observer of Figure 4 in a direction at right angles to the direction in which the camera is pointed. This is due to the fact that two prisms 17, 19 are located respectively in front of the view finder and in front of the lens. The two prisms are mounted in a carrier comprising upper and lower plates 21, 23. These plates are held rigidly in spaced relation by sleeves 25, 27, which extend through holes in the plates and have their upper and lower ends upset respectively upon the upper surface of plate 21 and the lower surface of plate 23, and by a post 29 the upper and lower ends of which are reduced in diameter and extend into alined holes in the plates. The plates are also held in rigid spaced relation by the means for holding the prisms in place.

Referring to Figure 3, which shows best the means for holding the prisms 17 in place, a sheet metal member 31 has right-angled flanges 33 which fit between the plates 21, 23 and are fastened to the upper plate 21 by screws 35, 37 and to the lower plate by similar screws, the member 31 having in it a square opening to expose the greater part of one of the square faces of the prism 17. Adapted to engage the oblong face of the prism is a vertical plate 41 having right-angled flanges 39 the upper of which is fastened to the plate 21 by screws 43, the lower flange 39 being fastened to the lower plate 23 by similar screws. In order to engage the other square face of the prism, there is provided a skeleton cap 45 having in it a square opening and provided with right-angled flanges 47, 49, which fit respectively over the plate 21 and under the plate 23. The flange 47 is fastened to the upper plate 21 by a screw 51 and by the screw 37; and the lower flange 45 is similarly fastened to the lower plate 23. The means for fastening the prism 19 in place is substantially the same as that which has just been described in connection with the prism 17 and will not be described in detail.

The sleeves 25, 27 are slidably mounted upon two upright rods 53, the upper ends of which are of reduced diameter and are fastened rigidly to a bracket 55 by nuts 57, the lower ends of these rods being similarly fastened to a bracket 59 by nuts 61, the brackets being detachably but firmly fastened to the body portion of the camera by thumb screws 63. The sleeves 25, 27 have horizontal slots 65 cut through their walls to receive the ends of a double-ended catch or detent 67; and the rods 53 have two pairs of grooves, an upper pair 69 and a lower pair 71, with either pair of which the double-ended catch or detent may be caused to cooperate. This catch or detent is fastened at its middle to the upright post 29 by a screw 73, the catch being of spring material and having rounded ends to fit into the grooves 69, 71 of the upright rods 53. When the prism carrier is pushed up into operative position, in which the prism 17 is in front of the view finder and the prism 19 is in front of the lens, as shown in Figure 4, the double-ended catch holds the carrier in that position. The carrier may, however, be pushed down, if desired, into the inoperative position shown in Figure 2, if it is desired to use the camera in the ordinary manner. The prisms may thus be moved from inoperative to operative position or vice versa instantly at any time.

In Figures 5 and 6, a modified carrier is shown which is adapted to hold two mirrors 77, 79. In general, this carrier does not differ essentially from the prism carrier which has been described above. Like the prism carrier, it comprises two sleeves 125, 127 which are adapted to slide on the rods 53 and a double-ended catch or detent 167 the ends of which extend through slots formed in the walls of the sleeves. Practically the only difference is that the upper and lower plates 121, 123 are of a different outline from that of the plates 21, 23; and that a somewhat different means is provided for holding the mirrors in place than was provided for holding the prisms. The mirror 79, which cooperates with the view finder, has its back resting against a plate 81 having rearwardly extending right-angled flanges, one of which is shown at 83 in Figure 5. This plate extends vertically between the main plates 121, 123 and is fastened to said main plates by screws, two of which are shown at 85 in Figure 5. This plate 81 has also two short flanges along its vertical edges to contact with the vertical edges of the mirror. The mirror is held against the plate 81 by a plate 87 having at its top and bottom two right-angled flanges through which pass pairs of screws which are threaded respectively into the upper plate 121 and the lower plate 123, the upper pair of these screws being shown in Figure 5 at 89. The vertical plate 87 is really merely a frame and has in it a square opening to expose the face of the mirror 79.

The mirror 77, which is adapted when in use to reflect light through the lens of the camera, is held in place in a manner similar to that in which the mirror 79 is held. The back of the mirror 77 rests against the vertical wall of a sort of cap 91 having right-angled flanges which fit respectively over the upper plate 121 of the carrier and under the under plate 123, said cap being held in place by screws 93 which pass through the flanges of the cap. The mirror 89 is held against the vertical wall of the cap 91 by a vertical plate 95 having in it a square opening to expose the face of the mirror. This vertical plate 95 has right-angled flanges which engage respectively the under side of the upper plate 121 and the upper side of the plate 123, the screws 93 which hold the cap 91 in place serving also to hold the vertical plate 95.

The reflectors, whether the prisms or the mirrors are used, are so located with respect to each other and with respect to the camera, that when they are in operative position, they reflect respectively into the view finder and through the lens light which comes from an object substantially at right angles to that in which the camera is pointed. The photographer, therefore, faces and points the camera in a direction at right angles to that in which the object is located, and, while viewing the object through the view finder, exposes the film. It should be particularly noted that during the exposure, the object is at all times visible and that, therefore, the camera may be moved during the exposure so as to secure a proper picture of a moving object.

Although the invention has been set forth as embodied in a particular device, it should be understood that the invention is not limited in the scope of its application to the particular device which has been shown and described.

Having described my invention, what I claim as new and desire to secure by Letters Patent of the United States is:—

1. The combination with a portable moving picture camera having a lens and a view finder independent of the lens of a support rigid with the camera, a carrier, and reflecting means for the lens and for the view finder mounted in the carrier, said carrier being freely movable on the support to bring the reflecting means instantly into and out of operative relation with respect to the lens and the finder.

2. The combination with a portable moving picture camera having a lens and a view finder independent of the lens of a support rigid with the camera, a carrier, reflecting means mounted in the carrier, said carrier being movably mounted on the support to bring the reflecting means instantly into and out of operative relation with respect to the lens and the finder, and a catch for holding the carrier in operative or inoperative position as may be desired.

3. A portable moving picture camera having, in combination, a lens, a view finder, a shutter, reflecting means located in operative relation to the lens and the view finder whereby an object located at one side of the direction in which the photographer is facing and the camera is pointing, will be visible to the photographer and will remain visible whether the shutter is open or closed, and guides upon which said reflecting means is slidably mounted.

4. A portable moving picture camera having in combination a lens, a view finder independent of the lens, a support rigid with the camera, a carrier movably mounted upon the support, reflecting means constructed and arranged to co-operate both with the lens and the finder, and means for mounting the reflecting means upon the carrier.

5. A portable moving picture camera having in combination a lens, a view finder independent of the lens, reflecting means for the lens and the view finder, means for mounting said reflecting means upon the frame of the camera for movement into two predetermined positions in one of which it is in operative relation to the lens and the view finder and in the other of which it is in inoperative relation to said lens and view finder, and means for holding the reflecting means in either position to which it may be moved.

6. A portable moving picture camera having in combination a lens, a view finder independent of the lens, reflecting means for the lens and the view finder, means for mounting said reflecting means upon the frame of the camera for movement into two predetermined positions in one of which it is in operative relation to the lens and the view finder and in the other of which it is in inoperative relation to said lens and view finder, and automatically operating means for holding the reflecting means in either position to which it may be moved.

7. A portable moving picture camera having in combination a lens, a view finder independent of the lens, reflecting means for the lens and the view finder, guiding means rigid with the camera and upon which the reflecting means is instantly slidable from operative to inoperative position with respect both to the lens and the view finder, and a catch for holding the reflecting means in either of the two positions into which it is moved.

8. A portable moving picture camera having, in combination a lens, a view finder independent of the lens, said camera being adapted to be held with the sight opening of the view finder before the eye of the operator, a support rigid with the camera, a carrier movably mounted upon the support, and reflecting means for both the lens and the view finder fastened to the carrier whereby, while the camera is maintained in position with the sight opening before the eye of the operator, the reflecting means may be readily moved from operative to inoperative position.

9. A portable moving picture camera having in combination a lens, a view finder independent of the lens, a support rigid with the camera, a carrier movably mounted upon the support, reflecting means for the lens, reflecting means for the view finder, and means for mounting both said reflecting means upon the carrier whereby both of said reflecting means may be moved simultaneously into and out of operative relation to the lens and finder.

In testimony whereof I have signed my name to this specification.

JOHN B. HADAWAY.